(12) United States Patent
Burd et al.

(10) Patent No.: US 9,994,009 B2
(45) Date of Patent: Jun. 12, 2018

(54) INVERTED DOUBLE DOME DOUBLE VACUUM DEBULK TOOL

(71) Applicant: The Boeing Company, Chicago, IL (US)

(72) Inventors: Patrick M. Burd, St. Louis, MO (US); Donald J. Cook, Edwardsville, IL (US); Tyler James Davis, Eldon, MO (US); Keenan S. Rickless, St. Peters, MO (US); Michael R. Scherr, St. Louis, MO (US); Robert Stuart Sullivan, Bethalto, IL (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 14/935,787

(22) Filed: Nov. 9, 2015

(65) Prior Publication Data

US 2017/0129232 A1    May 11, 2017

(51) Int. Cl.
| | | |
|---|---|---|
| *B29C 73/00* | (2006.01) | |
| *B29C 65/00* | (2006.01) | |
| *B32B 43/00* | (2006.01) | |
| *B32B 37/00* | (2006.01) | |
| *B65C 9/25* | (2006.01) | |
| *B65D 6/00* | (2006.01) | |
| *B65D 8/14* | (2006.01) | |

(Continued)

(52) U.S. Cl.
CPC ...... *B32B 37/1018* (2013.01); *B32B 37/0046* (2013.01); *B29C 70/44* (2013.01); *B29C 73/12* (2013.01); *B29C 73/32* (2013.01); *B32B 2309/68* (2013.01); *B32B 2556/00* (2013.01)

(58) Field of Classification Search
CPC ........... B65D 2543/00027; B65D 2543/00092; B65D 2543/00537; B29C 70/44; B29C 73/12; B29C 73/32; B29C 43/12; B29C 2043/3647; B29C 65/48; B29C 65/483; B29C 66/545; B29C 66/5452; B29C 66/8242; B29L 2031/712; B30B 5/02; B32B 37/0046; B32B 37/1009; B32B 37/1018
USPC ....... 156/60, 94, 98, 285, 286, 303.1, 307.1, 156/307.3, 307.7, 312, 323, 349, 381, 156/382, 423, 580, 581; 264/101, 102, 264/571; 425/389; 206/585; 220/8, 781; D7/356; 52/67

See application file for complete search history.

(56) References Cited

U.S. PATENT DOCUMENTS

| | | | |
|---|---|---|---|
| 3,080,090 A | * | 3/1963 | Young ................ B65D 43/0212 220/781 |
| 4,357,193 A | | 11/1982 | McGann et al. |

(Continued)

*Primary Examiner* — Philip C Tucker
*Assistant Examiner* — Brian R Slawski
(74) *Attorney, Agent, or Firm* — Ostrager Chong Flaherty & Broitman P.C.

(57) ABSTRACT

An inverted double dome double vacuum debulk tool having separable upper and lower chamber portions which can be assembled to form a vacuum chamber. In accordance with some embodiments, the top and bottom halves each comprise a circular cylindrical sidewall closed at one end by an inverted dome. The domes may be hemispherical or semi-elliptical with convex sides facing the chamber interior space. A base plate on which the composite patch rests is removable from the vacuum chamber. Various fittings pass electrical power and vacuum into the tool and sensor outputs out of the tool.

20 Claims, 5 Drawing Sheets

(51) Int. Cl.
    *C08J 5/00*     (2006.01)
    *C09J 5/00*     (2006.01)
    *B32B 37/10*     (2006.01)
    *B29C 73/32*     (2006.01)
    *B29C 73/12*     (2006.01)
    *B29C 70/44*     (2006.01)

(56) References Cited

U.S. PATENT DOCUMENTS

| | | |
|---|---|---|
| 6,149,749 A | 11/2000 | McBroom |
| 6,435,242 B1 | 8/2002 | Reis et al. |
| 6,468,372 B2 | 10/2002 | Kociemba et al. |
| 8,043,453 B2 | 10/2011 | Sawicki et al. |
| 8,986,479 B2 | 3/2015 | Evens et al. |
| 2014/0131347 A1* | 5/2014 | Eliot .................. H05B 6/80 |
| | | 219/762 |

* cited by examiner

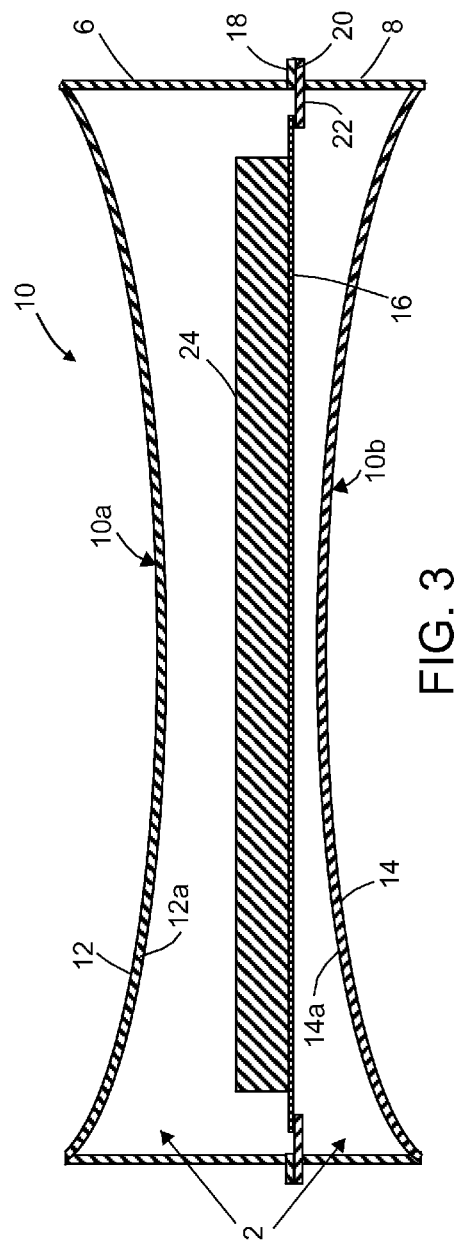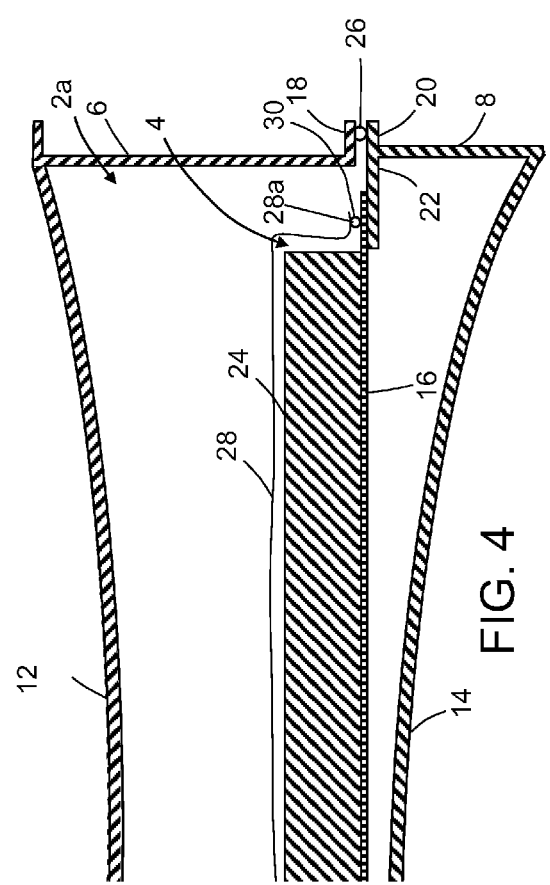

INVERTED DOUBLE DOME DOUBLE VACUUM DEBULK TOOL

BACKGROUND

This disclosure generally relates to systems and methods for repairing structures comprised of composite materials, and in particular, to methods and systems that use double vacuum debulking to repair structural components made of composite material, such as carbon fiber/epoxy composite material.

The use of structures comprised of composite materials has grown in popularity, particularly in such applications as aircraft airframes, where benefits include increased strength and rigidity, reduced weight and reduced parts count. When damaged, however, composite structures often require extensive repair work.

It is known to provide a repair method and system that uses double vacuum debulking (DVD) to repair a composite structure. As used herein, the term "double vacuum debulking" means a process in which a stack of repair plies is subjected to vacuum and mild heating without being compacted by atmospheric pressure. The purpose of the double vacuum debulk process is to minimize porosity in the repair plies by drawing air and other gases from between the plies while they are in an uncompacted state.

One known DVD process for repairing graphite/epoxy primary and secondary structures requires extensive preparation and multiple process steps to perform acceptable composite repairs. The steps required for processing successful composite repairs are very time consuming and labor intensive. For example, one existing solution requires the composite repair patch to be processed in an off-aircraft chamber to perform debulking (i.e., forming, degassing, consolidating, and staging the repair patch) for subsequent application onto the structure being repaired. More specifically, this DVD composite repair system is an off-aircraft process using support tooling (i.e., a vacuum chamber) to provide the first stage of producing a degassed, consolidated composite repair for application onto parent structure. The repairs in this process are produced on either flat or contoured support tooling, and consolidated using the first stage of the DVD process. The processed repair patch is then transferred to the parent aircraft structure and is cured in a second stage process using an adhesive layer in the bondline interface. Flat repair patches can be fabricated and applied to contoured structure, but when the contour becomes complex or radical, then separate contour matched tooling is required to fabricate the repair patch.

A manufacturer of aircraft made from composite materials may elect to transport a double vacuum debulk tool of the above-described type around the world to support aircraft repairs. However, current double vacuum debulk tools are heavy. Most examples found are box-shaped vacuum chambers. One known example has a convex dome. The bottom of the chamber is a base plate that the repair patch rests on. These tools are difficult to move and expensive to transport.

The design of a double vacuum debulk tool that is lighter in weight could save transportation costs and provide other advantages.

SUMMARY

The subject matter disclosed in some detail below is an inverted double dome double vacuum debulk tool having two separable halves (also referred to herein as "upper and lower chamber portions") which can be assembled to form a vacuum chamber. In accordance with some embodiments, the top and bottom halves each comprise a circular cylindrical sidewall closed at one end by an inverted dome. The domes may be hemispherical or semi-elliptical with convex sides facing the chamber interior space. A base plate on which the composite patch rests is removable from the vacuum chamber. The base plate can be flat or contoured depending on whether the desired shape of the repair patch is flat or contoured. Various fittings pass electrical power and vacuum into the tool and sensor outputs out of the tool.

The inverted double dome double vacuum debulk tools disclosed herein are lighter in weight compared to similar-capability tools due to a more efficient vacuum chamber shape. The light weight of the tool has advantages, including easier and less expensive transportability and safer handling. Additionally, using a lightweight internal base plate separable from the upper and lower halves that form the vacuum chamber may make it easier to move the repair patch to its place on the parent structure being repaired. This feature may offer operational advantages in the areas of repair time, safety, and defect reduction.

One aspect of the subject matter disclosed in some detail below is an apparatus comprising: a lower chamber portion comprising a first sidewall having upper and lower ends and a closure portion that closes the lower end of the first sidewall; and an upper chamber portion seated on and aligned with the lower chamber portion, the upper chamber portion comprising a second sidewall having upper and lower ends and a first inverted dome portion that closes the upper end of the second sidewall and is surrounded by second sidewall, wherein the upper and lower chamber portions define a chamber interior space.

In accordance with some embodiments, the apparatus described in the preceding paragraph further comprises: an internal circumferential flange connected to one of the first and second sidewalls; and a base plate disposed inside the chamber internal space, the base plate comprising a peripheral portion seated on the internal circumferential flange, wherein the internal circumferential flange is connected to the upper end of the first sidewall. In accordance with some embodiments, the apparatus described in the preceding paragraph further comprises: a vacuum bag; and a seal disposed between and in contact with the base plate and the vacuum bag along a closed path, wherein the vacuum bag, the base plate and the seal define a first portion of the chamber interior space that is not in fluid communication with a second portion of the chamber interior space defined at least in part by the vacuum bag, the upper and lower chamber portions, and the seal. In accordance with some embodiments, the apparatus described in the preceding paragraph further comprises: a first external circumferential flange connected to the upper end of the first sidewall; a second external circumferential flange connected to the lower end of the second sidewall, the first and second external circumferential flanges having respective surfaces that confront each other; and a seal disposed between and in contact with the first and second external circumferential flanges.

Preferably the closure portion of the lower chamber portion comprises a second inverted dome portion that is surrounded by the first sidewall. The first and second inverted dome portions may be hemispherical or semi-elliptical. In some embodiments, the first and second inverted dome portions comprise respective convex internal surfaces which face toward each other, while the first and second sidewalls comprise respective circular cylindrical portions. To facilitate transport, the circular cylindrical portion of the second sidewall may have an inner diameter which is greater than an outer diameter of the circular cylindrical portion of the first sidewall.

Another aspect of the subject matter disclosed in some detail below is a tool kit comprising: a first chamber portion comprising a first sidewall having upper and lower ends and a closure portion that closes the lower end of the first sidewall; and a second chamber portion comprising a second sidewall having upper and lower ends and an inverted dome portion that closes the upper end of the second sidewall, wherein the second sidewall surrounds the inverted dome portion, and wherein the first and second chamber portions are sized and configured so that, in a first configuration, the second chamber portion is seated on the first chamber portion to define a chamber interior space and, in a second configuration, a portion of the first chamber portion is nested in the second chamber portion with the first sidewall being surrounded by the second sidewall. The closure portion of the first chamber portion may comprise an inverted dome portion that is surrounded by the first sidewall. The inverted dome portions of the first and second chamber portions may be hemispherical or semi-elliptical. More specifically, the inverted dome portions may comprise respective convex internal surfaces which face toward each other when the first and second chamber portions are in the first configuration. The first and second sidewalls may comprise respective circular cylindrical portions. In some embodiments, the circular cylindrical portion of the second sidewall has an inner diameter which is greater than an outer diameter of the circular cylindrical portion of the first sidewall. The tool kit may further comprise: a first external circumferential flange connected to and extending radially outward from the first sidewall; and a second external circumferential flange connected to and extending radially outward from the second sidewall, wherein a surface of the second external circumferential flange is in contact with a first surface of the first external circumferential flange when the first and second chamber portions are in the first configuration and is in contact with a second surface of the first external circumferential flange when the first and second chamber portions are in the second configuration.

A further aspect of the subject matter disclosed herein is a method for transporting a vacuum chamber, comprising: nesting a portion of one of an upper chamber portion and a lower chamber portion inside the other of the upper and lower chamber portions, wherein the upper chamber portion comprises a sidewall having upper and lower ends and an inverted dome portion that closes the upper end of the sidewall, the sidewall of the upper chamber portion surrounding the inverted dome portion of the upper chamber portion, and wherein the lower chamber portion comprises a sidewall having upper and lower ends and a closure portion that closes the lower end of the lower chamber portion; and transporting the nested upper and lower chamber portions to a repair site. One sidewall surrounds the other sidewall when the upper and lower chamber portions are nested.

Yet another aspect is a method for debulking a composite repair patch, comprising: (a) nesting a portion of one of an upper chamber portion and a lower chamber portion inside the other of the upper and lower chamber portions, wherein the upper chamber portion comprises a sidewall having upper and lower ends and an inverted dome portion that closes the upper end of the sidewall, the sidewall of the upper chamber portion surrounding the inverted dome portion of the upper chamber portion, and wherein the lower chamber portion comprises a sidewall having upper and lower ends and a closure portion that closes the lower end of the sidewall of the lower chamber portion; (b) transporting the nested upper and lower chamber portions to a repair site; (c) separating the upper and lower chamber portions from each other at the repair site; (d) placing a base plate on a portion of the lower chamber portion which is away from the closure portion of the lower chamber portion; (e) placing an uncured composite repair patch on the base plate; (f) placing a vacuum bag over the uncured composite repair patch; (g) placing the upper chamber portion on top of the lower chamber portion to define a sealed chamber interior space; (h) debulking the composite repair patch after steps (a) through (g) have been completed; (i) separating the upper chamber portion from the lower chamber portion after step (h) has been completed; and (j) after step (i), separating the base plate from the lower chamber portion while the debulked composite repair patch remains on the base plate.

Other aspects of inverted double dome double vacuum debulk tools are disclosed below.

BRIEF DESCRIPTION OF THE DRAWINGS

FIG. 3 is a diagram representing a sectional view of the inverted double dome double vacuum debulk tool depicted in FIG. 1. FIG. 3 also shows an uncured composite repair patch supported on a base plate inside the inverted double dome double vacuum debulk tool.

FIG. 4 is a diagram representing a portion of the sectional view depicted in FIG. 3 with the addition of a vacuum bag overlying the composite repair patch.

Reference will hereinafter be made to the drawings in which similar elements in different drawings bear the same reference numerals.

DETAILED DESCRIPTION

Illustrative embodiments of inverted double dome double vacuum debulk tools are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. For example, the thickness, shape, size, and reinforcement of the vacuum chamber could be readily defined once detailed requirements have been determined.

Figure 1:
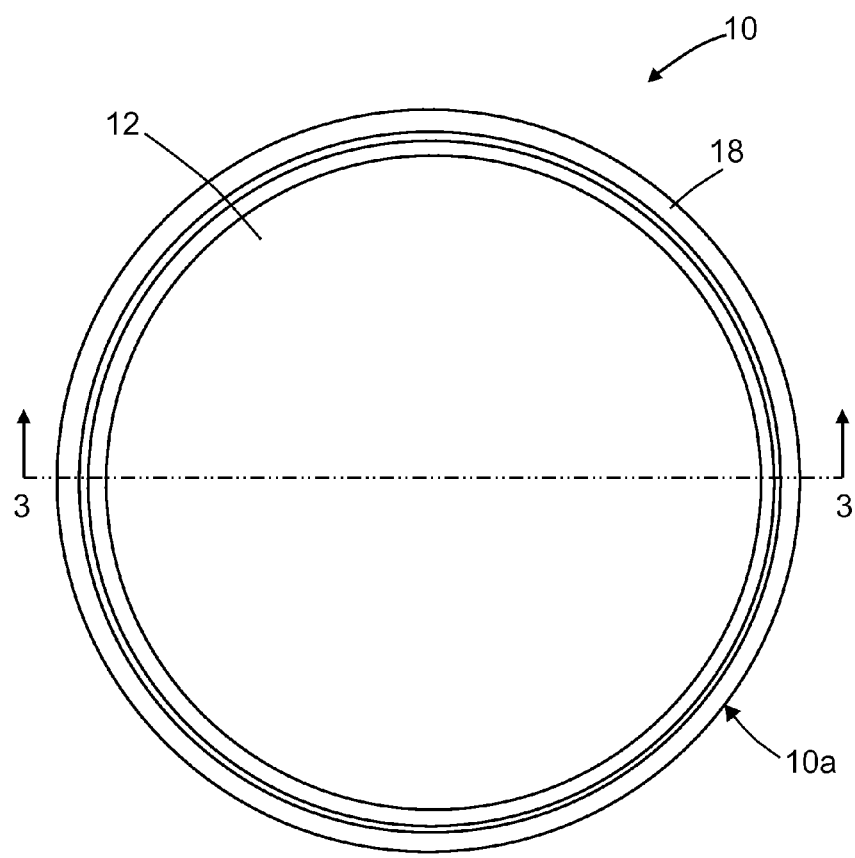
FIG. 1 is a diagram representing a plan view of a inverted double dome double vacuum debulk tool in accordance with one embodiment.
Figure 2:
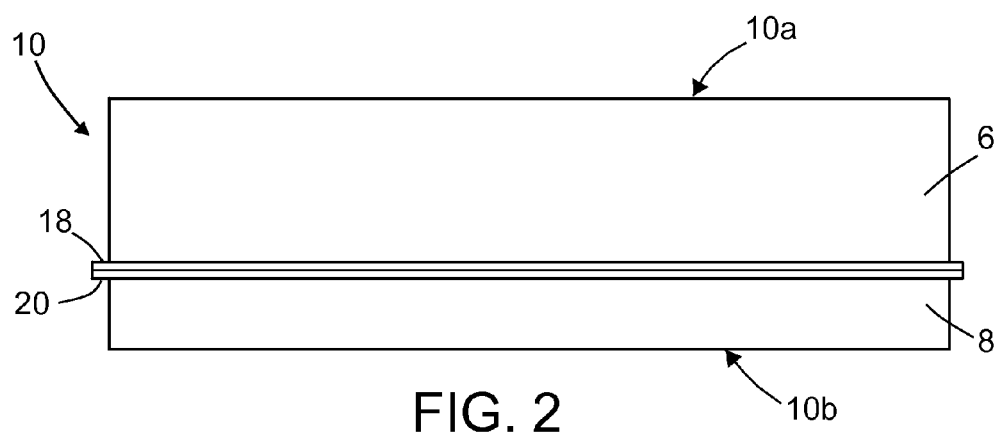
FIG. 2 is a diagram representing an elevation view of the inverted double dome double vacuum debulk tool depicted in FIG. 1

FIGS. 1 and 2 are diagrams representing plan and elevation views respectively of an inverted double dome double vacuum debulk tool in accordance with one embodiment. As seen in FIG. 1, the apparatus comprises a generally circular vacuum chamber 10. As seen in FIG. 2, the vacuum chamber 10 is formed by a shell-shaped upper chamber portion 10*a* seated on and aligned with a shell-shaped lower chamber portion 10*b*. The upper chamber portion 10*a* comprises a sidewall 6 having upper and lower ends and an inverted dome portion 12 (shown in FIG. 3) that closes the upper end of the sidewall 6 and is surrounded by sidewall 6. The lower chamber portion 10*b* comprises a sidewall 8 having upper and lower ends and a closure portion 14 (shown in FIG. 3) that closes the lower end of the sidewall 8 and is surrounded by sidewall 8. In the embodiment depicted in FIGS. 1-3, the sidewalls 6 and 8 comprise respective circular cylindrical portions and the closure portion 14 is in the form of an inverted dome (hereinafter "inverted dome portion 14"). In alternative embodiments, the closure portion of the lower chamber portion 10*b* may be semi-elliptical or flat. The upper and lower chamber portions 10*a* and 10*b* can be made of aluminum alloy or other lightweight material having sufficient strength and ability to withstand the temperatures produced inside the vacuum chamber 10 during the debulking process.

As seen in FIG. 3, the upper and lower chamber portions 10*a* and 10*b* define a chamber interior space 2. In addition, the upper chamber portion 10*a* comprises an external circumferential flange 18 connected to and extending radially outward from the lower end of sidewall 6, whereas the lower chamber portion 10*b* comprises an external circumferential flange 20 connected to and extending radially outward from the upper end of sidewall 6. The external circumferential flanges 18 and 20 have respective surfaces that confront each other in the configuration depicted in FIGS. 1-3. As best seen in FIG. 4, a seal 26 (e.g., sealing tape or an elastomeric gasket) is placed between the confronting surfaces of external circumferential flanges 18 and 20 to ensure that the chamber interior space 2 formed by the upper and lower chamber portions 10*a* and 10*b* is airtight.

As best seen in FIG. 3, the inverted dome portion 12 and 14 in accordance with the depicted embodiment are hemispherical. In other embodiments, the inverted dome portions 12 and 14 can be semi-elliptical. The inverted dome portions 12 and 14 comprise respective convex internal surfaces 12*a* and 14*a* which face toward each other.

The apparatus depicted in FIGS. 3 and 4 further comprises an internal circumferential flange 22 connected to the upper end of the sidewall 8 of lower chamber portion 10*b* and a flat base plate 16 disposed inside the chamber internal space 2. The base plate 16 comprises a peripheral portion seated on the internal circumferential flange 22. In accordance with one embodiment, the base plate 16 is circular and the internal circumferential flange 22 is annular, the outer diameter of the base plate 16 being greater than the inner diameter of the internal circumferential flange 22.

As seen in FIG. 3, a composite layup 24 to be debulked, consisting of a stack of plies of uncured fiber-reinforced resin material designed to form a repair patch when cured, can be placed on the base plate 16 and supported thereby. As seen in FIG. 4, a vacuum bag 28 (made, e.g., of plastic film) can be placed over the composite layup 24, with a peripheral portion 28*a* of the vacuum bag 28 being sealed to the base plate 16 by a seal 30 (e.g., sealing tape or an elastomeric gasket) disposed between and in contact with base plate 16 and vacuum bag 28 along a closed path. Other components of the stack-up used for double vacuum debulking are not shown in FIGS. 3 and 4, but will be briefly described with reference to FIG. 5 hereinafter.

The vacuum bag 28, seal 30 and base plate 16 define a first portion 4 of the chamber interior space 2 that is not in fluid communication with a second portion 2*a* of the chamber interior space 2 defined in part by vacuum bag 28, upper chamber portion 10*a* and seal 30. The first portion 4 of the chamber interior space 2 is an airtight interior space that may be evacuated to a slightly different vacuum pressure than the vacuum pressure in the remainder of the chamber interior space 2 during debulking, as will be explained in more detail below.

In accordance with some embodiments, the base plate 16 floats, i.e., is not affixed to the lower chamber portion 10*b*. The use of a floating base plate reduces the potential for deflection of the base plate due to vacuum loading. The elimination of base plate deflection reduces the possibility that the plies of the composite layup 24 will change shape during debulking. Apertures (not shown in the drawings) can be provided in the base plate 16 or in the internal circumferential flange 22 of the upper chamber portion 10 to equalize the vacuum pressure in the portions of the remainder of the chamber interior space 2 above and below the base plate 16. Accordingly, the base plate 16 does not resist the vacuum pressure because the pressure is the same on both sides of the base plate 16.

Figure 5:
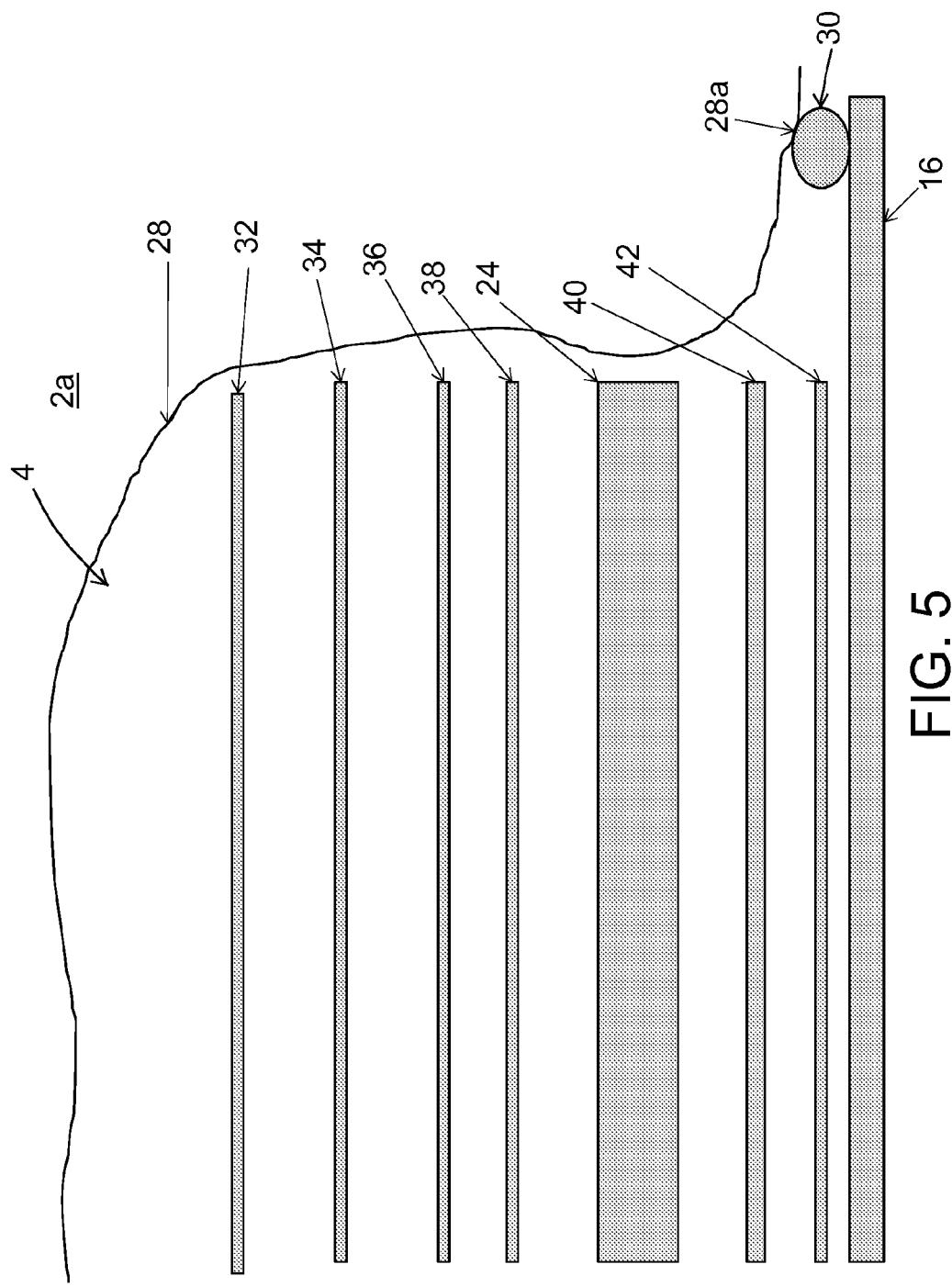
FIG. 5 is a diagram representing an exploded view of a stack-up of components that would be arranged between the vacuum bag and the base plate depicted in FIG. 4 in accordance with one embodiment.

FIG. 5 is a diagram representing an exploded view of a stack-up of components that would be arranged between the vacuum bag 28 and the base plate 16 in accordance with one embodiment. First, an electric heating blanket 42 is laid on the base plate 16. Then a release film/fabric 40 is draped over the heating blanket 42. The composite layup 24 is then placed on the release film/fabric 40. A release film/fabric 38 is then draped over the composite layup 24, followed in sequence by a bleeder cloth 36, a release film 34, and a breather cloth 32. This stack-up of components in then covered by the vacuum bag 28.

As used herein, the term "breather" means a porous material that serves as a continuous air path over or around the part being repaired, but is not in contact with the resin of the composite repair material. As used herein, the term "bleeder" means porous material used to remove trapped air and volatiles and to absorb excess resin from prepreg.

FIGS. 1-5 do not show the fittings that would be needed to power the electric heating blanket 42 or pull the vacuum inside the vacuum bag 28 and inside the chamber interior space 2. For example, two vacuum probes (not shown) can be installed in respective apertures in the vacuum bag 28, one vacuum probe being coupled to a vacuum source (not shown) by a hose and the other vacuum probe being coupled to a vacuum gauge (not shown) which measures the pressure inside the space 4 partly defined by and disposed underneath the vacuum bag 28.

In addition, a temperature controller (not shown) can be connected to the electric heating blanket 40 and to a plurality (e.g., four) of thermocouples (not shown). The temperature controller 50 can be programmed to control the electrical power being supplied to the electric heating blanket 40 as a function of the temperatures detected by the thermocouples in accordance with a desired temperature cycle. FIGS. 1-5 also do not show the thermocouples for feedback to the temperature controller.

The aforementioned fittings would pass through the chamber wall and through the base plate 16 of the tool. These fittings and the controller would be no different than for other existing vacuum bagging setups, with the exception that if the base plate 16 is removable, then the fittings would be separable at the base plate 16.

In accordance with one double vacuum debulking process using the apparatus depicted in FIGS. 1-5, a vacuum may be applied to both the space 4 under the vacuum bag 28 and the remainder of the chamber interior space 2, the vacuum in space 4 being ≥26 inHg and the vacuum in the remainder of the chamber interior space 2 being equal to the vacuum in space 4 +0/−1 inHg. Then the electric heating blanket 40 can be heated to a soak temperature of 220°±10° F. at a ramp rate of 3°±1° F./min and then the composite layup 24 is subjected to the soak temperature for a dwell time of 30 (±5) minutes. The remainder of the chamber interior space 2 can then be vented while the vacuum in space 4 remains for the compaction phase.

After the debulking process has been completed, the base plate 16 (with the composite layup 24 thereon) is readily separable from the lower chamber portion 10b. Using a lightweight internal base plate that is separable from the vacuum chamber 10 may make it easier to move the debulked and partially cured composite layup 24 to its place on the parent structure being repaired. This feature may offer operational advantages in the areas of repair time, safety, and defect reduction. In addition, the base plate 16 may be made of a material having poor thermal conductivity (e.g., a composite material) so that minimal heat generated by the heating blanket 40 is dissipated in the base plate 16. One suitable composite material is phenolic paper (i.e., board made of wood fiber and phenolic polymers).

In addition, the vacuum chamber 10 is designed to reduce transportation costs. In particular, the vacuum chamber 10 is lighter in weight compared to similar-capability tools due to a more efficient vacuum chamber shape. The light weight of the tool has advantages, including easier and less expensive transportability and safer handling. Also, the upper and lower chamber portions 10a and 10b can be designed so that one nests inside the other during shipment, thereby reducing the shipped volume of the tool. In addition, the inverted dome shapes reduce the volume of air that needs to be evacuated from the chamber interior space 4. Also, the design of the vacuum chamber 10 results in symmetrical loading during use, which will provide consistent pressure on the seal 26, thereby reducing leaks and improving process efficiency and quality.

Figure 6:
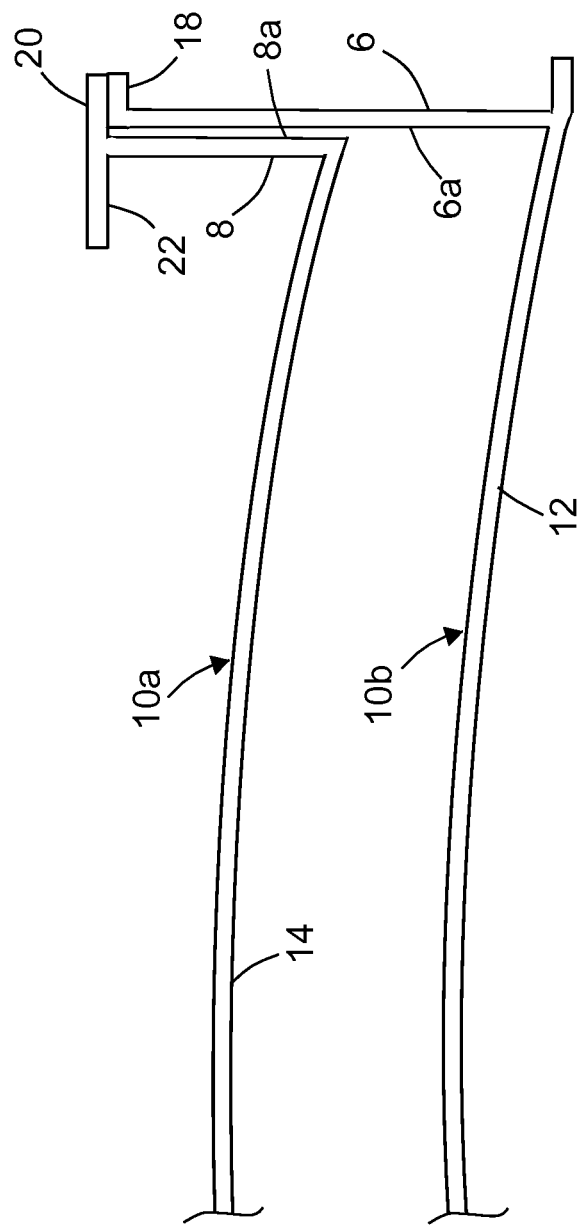
FIG. 6 is a diagram representing a portion of a sectional view (without hatching) of the lower chamber portion depicted in FIG. 3 nested in the upper chamber portion also depicted in FIG. 1 for the purpose of facilitating transport to a repair site.

FIG. 6 is a diagram representing a portion of a sectional view (without hatching) of the lower chamber portion 10b nested in the upper chamber portion 10a for the purpose of facilitating transport to a repair site. In this embodiment, the circular cylindrical sidewall 6 of the upper chamber portion 10a has an inner diameter 6a which is greater than an outer diameter 8a of the circular cylindrical sidewall 8 of the lower chamber 10b, which allows the lower chamber portion 10b to nest inside the upper chamber portion 10a when the vacuum chamber 10 is disassembled. In this configuration, sidewall 6 of the upper chamber portion 10a surrounds sidewall 8 of the lower chamber 10b, while the external circumferential flange 20 of the lower chamber 10b sits atop the external circumferential flange 18 of the upper chamber 10a.

Figure 7:
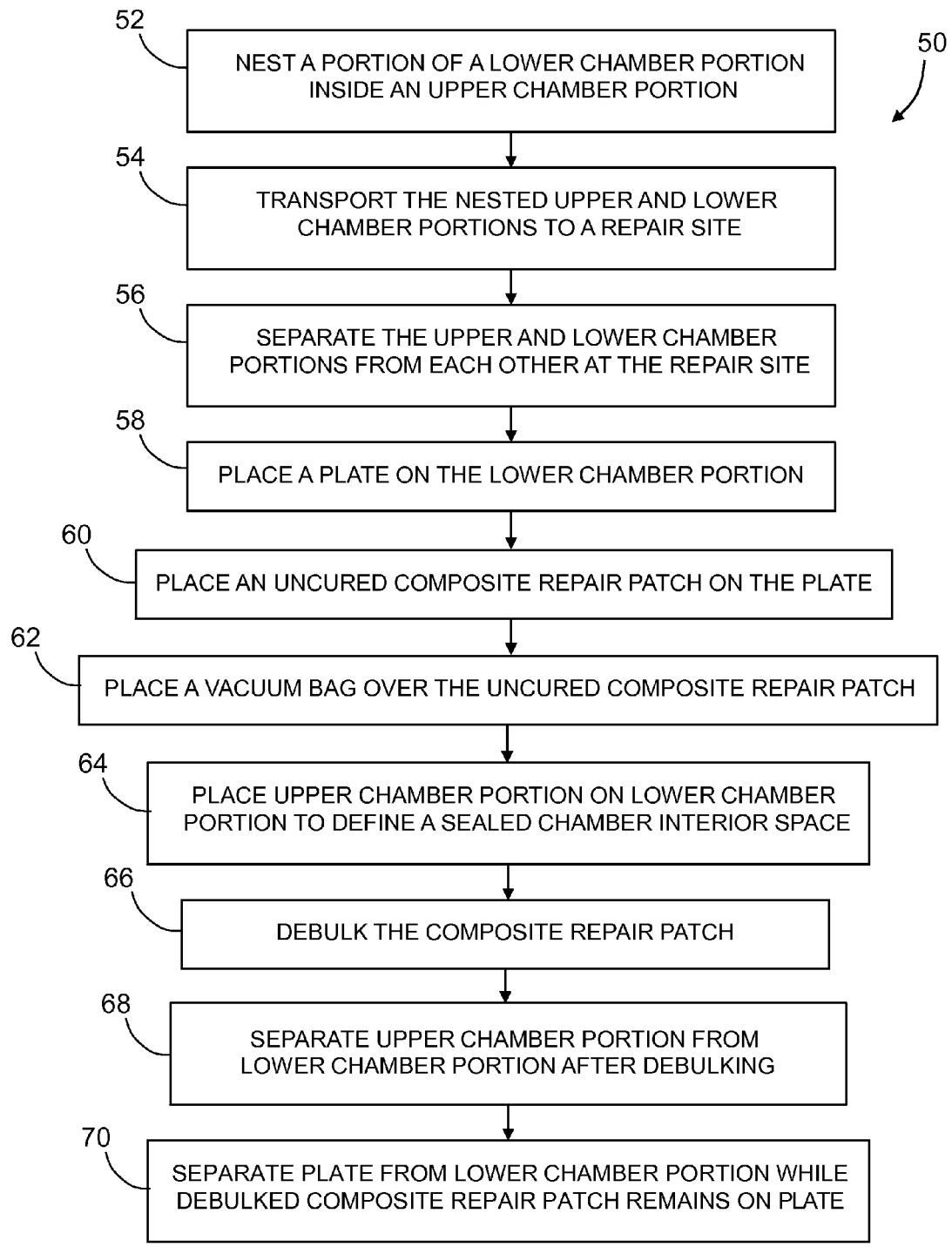
FIG. 7 is a flowchart identifying steps of a method for debulking a composite repair patch in accordance with one embodiment.

Finally, FIG. 7 is a flowchart identifying steps of a method 50 for debulking a composite repair patch in accordance with one embodiment. First, a portion of the lower chamber portion 10b is nested inside the upper chamber portion 10a (step 52). Then the nested upper and lower chamber portions are transported to a repair site (step 54). At the repair site the upper and lower chamber portions are separated from each other (step 56). The base plate 16 is then placed on the lower chamber portion 10b (step 58). Then an uncured composite repair patch (i.e., composite layup 24) is placed on the base plate 16 with the intervening electric heating blanket 40 and release film/fabric 40 (step 60). After the release film/fabric 38, bleeder cloth 36, release film 34, and breather cloth 32 have been placed over the composite layup 24, a vacuum bag 28 is placed over the stack-up (step 62). Then the upper chamber portion 10a is placed on top of the lower chamber portion 10b to define the sealed chamber interior space 2 (step 64). Then the composite repair patch is subjected to the double vacuum debulking process (step 66). Following the completion of debulking, the upper chamber portion 10a is separated from the lower chamber portion 10b. Then the base plate 16 can be separated from the lower chamber portion 10b while the debulked composite repair patch remains on the base plate 16 and moved to the parent structure where the repair patch can be placed over the repair site and fully cured (step 70).

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. A method for debulking a composite repair patch, comprising:
    (a) nesting a portion of one of an upper chamber portion and a lower chamber portion inside the other of the upper and lower chamber portions, wherein the upper chamber portion comprises a sidewall having upper and lower ends and an inverted dome portion that closes the upper end of the sidewall, the sidewall of the upper chamber portion surrounding the inverted dome portion of the upper chamber portion, and wherein the lower chamber portion comprises a sidewall having upper and lower ends and a closure portion that closes the lower end of the lower chamber portion;
    (b) transporting the nested upper and lower chamber portions to a repair site;
    (c) separating the upper and lower chamber portions from each other at the repair site;
    (d) placing a base plate on a portion of the lower chamber portion which is away from the closure portion of the lower chamber portion;
    (e) placing an uncured composite repair patch on the base plate;
    (f) placing a vacuum bag over the uncured composite repair patch;
    (g) placing the upper chamber portion on top of the lower chamber portion to define a sealed chamber interior space;
    (h) debulking the composite repair patch after steps (a) through (g) have been completed;
    (i) separating the upper chamber portion from the lower chamber portion after step (h) has been completed; and
    (j) after step (i), separating the base plate from the lower chamber portion while the debulked composite repair patch remains on the base plate.

2. The method as recited in claim 1, wherein one sidewall surrounds the other sidewall when the upper and lower chamber portions are nested.

3. The method as recited in claim 1, wherein the closure portion of the lower chamber portion comprises an inverted dome portion that is surrounded by the sidewall of the lower chamber portion.

4. The method as recited in claim 3, wherein the inverted dome portions are hemispherical or semi-elliptical.

5. The method as recited in claim 3, wherein the inverted dome portions comprise respective convex internal surfaces which face toward each other.

6. The method as recited in claim 1, wherein the sidewalls comprise respective circular cylindrical portions.

7. The method as recited in claim 1, wherein a surface of a first external circumferential flange connected to and extending radially outward from the sidewall of the upper chamber portion is in contact with a surface of a second external circumferential flange connected to and extending radially outward from the sidewall of the lower chamber portion when the upper and lower chamber portions are nested.

8. A method for debulking a composite repair patch, comprising:
   (a) nesting a portion of one of an upper chamber portion and a lower chamber portion inside the other of the upper and lower chamber portions, wherein the upper chamber portion comprises a sidewall having upper and lower ends and an inverted dome portion that closes the upper end of the sidewall, the sidewall of the upper chamber portion surrounding the inverted dome portion of the upper chamber portion, and wherein the lower chamber portion comprises a sidewall having upper and lower ends and a closure portion that closes the lower end of the lower chamber portion;
   (b) separating the upper and lower chamber portions from each other so that they are no longer nested;
   (c) placing a base plate on a portion of the lower chamber portion which is away from the closure portion of the lower chamber portion;
   (d) placing an uncured composite repair patch on the base plate;
   (e) placing a vacuum bag over the uncured composite repair patch;
   (f) placing the upper chamber portion on top of the lower chamber portion to define a sealed chamber interior space; and
   (g) debulking the composite repair patch inside the sealed chamber interior space after steps (a) through (f) have been completed.

9. The method as recited in claim 8, wherein one sidewall surrounds the other sidewall when the upper and lower chamber portions are nested.

10. The method as recited in claim 8, wherein the closure portion of the lower chamber portion comprises an inverted dome portion that is surrounded by the sidewall of the lower chamber portion.

11. The method as recited in claim 10, wherein the inverted dome portions are hemispherical or semi-elliptical.

12. The method as recited in claim 10, wherein the inverted dome portions comprise respective convex internal surfaces which face toward each other when the upper chamber portion is placed on top of the lower chamber portion.

13. The method as recited in claim 8, wherein a surface of a first external circumferential flange connected to and extending radially outward from the sidewall of the upper chamber portion is in contact with a surface of a second external circumferential flange connected to and extending radially outward from the sidewall of the lower chamber portion when the upper and lower chamber portions are nested.

14. A method for debulking a composite repair patch, comprising:
   (a) nesting a portion of one of an upper chamber portion and a lower chamber portion inside the other of the upper and lower chamber portions, wherein the upper chamber portion comprises a sidewall having upper and lower ends and a closure portion that closes the upper end of the sidewall, and the lower chamber portion comprises a sidewall having upper and lower ends and a closure portion that closes the lower end of the lower chamber portion;
   (b) separating the upper and lower chamber portions from each other so that they are no longer nested;
   (c) placing a base plate on a portion of the lower chamber portion which is away from the closure portion of the lower chamber portion;
   (d) placing an uncured composite repair patch on the base plate;
   (e) placing a vacuum bag over the uncured composite repair patch;
   (f) placing the upper chamber portion on top of the lower chamber portion to define a sealed chamber interior space; and
   (g) debulking the composite repair patch inside the sealed chamber interior space after steps (a) through (f) have been completed.

15. The method as recited in claim 14, wherein one sidewall surrounds the other sidewall when the upper and lower chamber portions are nested.

16. The method as recited in claim 14, wherein the closure portion of the upper chamber portion comprises an inverted dome portion that is surrounded by the sidewall of the upper chamber portion.

17. The method as recited in claim 16, wherein the closure portion of the lower chamber portion comprises an inverted dome portion that is surrounded by the sidewall of the lower chamber portion.

18. The method as recited in claim 17, wherein the inverted dome portions are hemispherical or semi-elliptical.

19. The method as recited in claim 17, wherein the inverted dome portions comprise respective convex internal surfaces which face toward each other when the upper chamber portion is placed on top of the lower chamber portion.

20. The method as recited in claim 14, wherein a surface of a first external circumferential flange connected to and extending radially outward from the sidewall of the upper chamber portion is in contact with a surface of a second external circumferential flange connected to and extending radially outward from the sidewall of the lower chamber portion when the upper and lower chamber portions are nested.

* * * * *